United States Patent [19]

Bristol et al.

[11] Patent Number: 5,541,833
[45] Date of Patent: Jul. 30, 1996

[54] MULTIVARIABLE FEEDFORWARD ADAPTIVE CONTROLLER

[75] Inventors: Edgar H. Bristol, Foxboro; Peter D. Hansen, Wellesley, both of Mass.

[73] Assignee: The Foxboro Company, Foxboro, Mass.

[21] Appl. No.: 97,916

[22] Filed: Jul. 28, 1993

Related U.S. Application Data

[63] Continuation of Ser. No. 750,133, Aug. 26, 1991, abandoned, which is a continuation-in-part of Ser. No. 355,026, May 22, 1989, Pat. No. 5,043,863, which is a continuation of Ser. No. 31,964, Mar. 30, 1987, abandoned.

[51] Int. Cl.$^6$ ............................................. G05B 13/04
[52] U.S. Cl. .................... 364/165; 364/151; 364/157; 364/177
[58] Field of Search .................................... 364/148–151, 364/157–159, 164, 165, 153, 156, 177, 183; 318/561

[56] References Cited

U.S. PATENT DOCUMENTS

| | | | |
|---|---|---|---|
| 3,798,426 | 3/1974 | Bristol, II | 235/151.1 |
| 3,934,124 | 1/1976 | Gabriel | 235/150.1 |
| 4,006,346 | 2/1977 | Pemberton | 235/150.1 |
| 4,349,869 | 9/1982 | Prett et al. | 364/159 |
| 4,451,878 | 5/1984 | Shigemasa | 364/151 |
| 4,489,376 | 12/1984 | Putman | 364/165 |
| 4,555,757 | 11/1985 | Dorman | 364/165 |
| 4,563,735 | 1/1986 | Hiroi et al. | 364/165 |
| 4,602,326 | 7/1986 | Kraus | 364/158 |
| 4,651,272 | 3/1987 | El-Ibiary et al. | 364/176 |
| 4,698,745 | 10/1987 | Hiroi et al. | 364/165 |
| 4,754,410 | 6/1988 | Leech et al. | 364/513 |
| 4,855,897 | 8/1989 | Shinskey | 364/148 |
| 4,864,490 | 9/1989 | Nomoto et al. | 364/157 |
| 4,903,192 | 2/1990 | Saito et al. | 364/157 |
| 4,951,191 | 8/1990 | Hiroi et al. | 364/165 |
| 5,029,066 | 7/1991 | Hiroi | 364/162 |
| 5,043,862 | 8/1991 | Takahashi et al. | 364/162 |
| 5,079,691 | 1/1992 | Heck et al. | 364/165 |
| 5,153,807 | 10/1992 | Saito et al. | 364/165 |
| 5,166,873 | 11/1992 | Takatsu et al. | 364/151 |

FOREIGN PATENT DOCUMENTS

| | | |
|---|---|---|
| 0152871 | 8/1985 | European Pat. Off. . |
| 2524169 | 9/1983 | France . |
| 60-263207 | 12/1985 | Japan . |
| 63-046502 | 2/1988 | Japan . |
| 1239603 | 9/1989 | Japan . |
| 9207023 | of 0000 | WIPO . |
| 8807708 | 10/1988 | WIPO . |

OTHER PUBLICATIONS

F. Radke, "Microprocessor–Based Adaptive Pid–Controllers", *ISA Transactions*, V 27n.2 (1988) pp. 43–50.

Mauricio Alves da Silva, et al., "A Rule Based Procedure for Selftuning Pid Controllers", Pro. 27th IEEE Conf. on Decision and Control, vol. 313, pp. 1947–1951, 1988.

E. H. Bristol, et al., "Moment Projection Feedforward Control Adaptation", The Foxboro Company, Research Department, Foxbora, MA; (Date Unknown).

Katsuhiko Ogata, "Modern Control Engineering", Prentice–Hall Electrical Engineering Series, University of Minnesota, 1970.

*Primary Examiner*—Joseph Ruggiero
*Attorney, Agent, or Firm*—Terrence Martin; Jules Jay Morris; David Barron

[57] ABSTRACT

Multivariable adaptive feedforward control may be accomplished by detecting the beginning and ending of a process control disturbance response, characterizing the measured inputs and process output during the disturbance by moments, which comprise time-weighted integrals performed on the process result output and inputs when the disturbance is a measured disturbance, and relating the characterized inputs and process result output in known general transfer function model equations to generate transfer function parameters which are used to calculate the coefficients of feedforward additive or multiplicative compensators.

51 Claims, 9 Drawing Sheets

MULTIVARIABLE FEEDFORWARD ADAPTIVE CONTROLLER

CROSS REFERENCE TO RELATED APPLICATION

This is a continuation of application Ser. No. 07/750,138 filed on Aug. 25, 1991 now abandoned, while is a continuation-in-part of application Ser. No. 07/355,026, filed May 22, 1989, now U.S. Pat. No. 5,043,863, which is a continuation of application Ser. No. 07/031,964, filed Mar. 30, 1987 now abandoned.

BACKGROUND OF THE INVENTION

1. Technical Field

The invention relates generally to control equipment for controlling industrial or similar processes and particularly to self-tuning controllers. More particularly, the invention concerns feedforward controllers wherein operating parameters are developed in response to changes in the process inputs.

2. Background Art

Control systems regulate many material, energy and guidance systems. Feedforward control is a rarer and more specialized control method. Feedforward recognizes that upsets in the inputs to the system can be used to adjust the system devices in anticipation of or simultaneously with the arrival of those upsets. An advanced form of feedforward control is given in U.S. patent application Ser. No. 07/355,026, assigned to the assignee of the present invention, the teaching of which is incorporated herein by reference. If all the load variables for a particular process are sensed, transmitted, and responded to without error, and if the relationship between manipulated and measured variables is exactly known, then perfect control is theoretically possible provided the ideal feedforward controller is stable and physically realizable. Feedforward control is discussed at length in U.S. patent application Ser. No. 07/355,026, which describes an advanced adaptive control technique.

The present invention is directed to an adaptive feedforward control method and apparatus in which feedforward compensators tune for measured load variables. Because feedforward compensators are generally known to be difficult to tune manually and require retuning as process conditions change with the prior art apparatus, feedforward is not widely used. Feedforward controllers which reliably update their tuning constants after each naturally occurring isolated disturbance are unknown. As a result, many process control applications could advantageously incorporate adaptive feedforward control were such apparatus available.

DISCLOSURE OF THE INVENTION

The method and apparatus developed for multivariable adaptive feedforward control in U.S. patent application 07/355,026 has been substantially improved upon.

In the present improvement on our earlier embodiment, it is an advantage that it is unnecessary to detune the feedback controller if its action would interfere with that of the feedforward controller, as with the prior art. On the contrary, in the present use, the feedforward adapter detunes the feedforward controller, so that rejection of unmeasured load disturbances by the feedback controller is not compromised.

As with the embodiment described in U.S. patent application 07/355,026, the present embodiment uses a moment-projection method of model identification as a basis for its feedforward-compensator design calculation. Measured time moments of the process inputs and output (for an isolated disturbance response) are related with model equations to unknown model parameters. The protection method is used to robustly update the model parameters.

In the present invention, provision is made for either additive or multiplicative feedforward compensation. As with the previous embodiment, incremental additive compensations are added to the feedback controller's integral feedback signal so that these incremental compensations are accumulated by the integral action of the feedback controller. As explained previously, this is done so that an adaptive change of a feedforward gain will not 'bump' the process. In the present embodiment, the absolute feedforward compensation of one of the measured loads may be directly added to or multiplied by the feedback controller output. Only the dynamic (delay) portion of an absolute compensation is explicitly adapted because a compensator gain change would bump the process. The integral action of the feedback controller implicitly adjusts the effective gain of a multiplicative compensation and the net bias of all additive compensations.

Multiplicative compensations are particularly useful in temperature and composition control applications where the feedback controller output adjusts the ratio of a manipulated flow to a measured load flow. An absolute additive feedforward compensation may be used in an inventory (level or pressure) control application where the feedback controller adjusts the sum or difference of a manipulated flow with a measured load flow. In the following discussion "incremental" loads are measured loads that are compensated by accumulating incremental compensations with the feedback controller. An "absolute" load is a measured load that is compensated by direct application of the absolute (total) compensation to the feedback controller output.

It has been found useful to provide for detuning of the feedforward compensation when the combination of feedforward and feedback would conflict. The previous disclosure included derivative filtering of identifier inputs; improved performance is provided by use of adaptively tuned bandpass filtering. The present invention includes error peak detection for sensing loads and the end of a response to a measured load disturbance. Finally, multiple stored sets of model coefficients are used in the present invention, indexed according to conditions at the start of an isolated response. The sets may be indexed according to the disturbance sign (direction) and/or subrange of a user-specified variable. Each noise threshold, used to detect a measured disturbance, is updated during quiet periods between disturbances.

The present controller method and apparatus requires a feedback controller, whose integral action adjusts the output bias to achieve zero steady state error. The feedback controller may be either digital or analog. The feedback controller may be self-tuned as taught in U.S. patent application Ser. No. 07/553,915, assigned to the assignee hereof, the teaching of which is hereby incorporated by reference, or its functional equivalents. In this present use, it is an advantage that it is unnecessary to detune the feedback controller if its action would interfere with that of the feedforward controller as with the prior art. On the contrary, in the present use, the feedforward adapter detunes the feedforward controller, so that rejection of unmeasured load disturbances by the feedback controller is not compromised.

In view of the foregoing limitations and shortcomings of the prior art devices, as well as other disadvantages not specifically mentioned above, it should be apparent that there still exists a need in the art for an improved adaptive feedforward controller. It is therefore an objective of the present invention to provide a robust, improved adaptive feedforward controller.

It is an objective to provide a device wherein variations in the system relations, and variations in the timing attributes are accommodated by the adaptive feedforward control scheme while at the same time accommodating load variations.

It is an objective to provide a control device that operates with incomplete data for making a unique identification of all compensator parameters.

It is an objective to provide an adaptive controller for a number of measured load variables. The adaptation of each compensator should be quick when its inputs are active, regardless of the activity of other load inputs.

It is an advantage of the present invention that projection changes only those model parameters for which the response contains significant information. The projection method converges very rapidly when the successive disturbance responses contain orthogonal information such as results when one load at a time is disturbed with steps.

Another advantage of the present embodiment of the invention resides in that the feedforward corrections can be either incremental or absolute. If both are used in the same loop, the loop is to be structured so that the incremental correction is made before the absolute correction.

In order to better cope with nonlinearity, successful past tunings of the controller are remembered and correlated with conditions at the start of the disturbance. The most appropriate set of model parameters is selected as soon as the new disturbance is sensed and is updated when the response is completed. New compensator parameters are computed from these model parameters. This is a form of gain scheduling, where the gain schedule itself is adapted through model identification.

Another advantage of this embodiment is that virtually no user-set parameters are required. The error noise threshold may be passed from an adaptive feedback controller. Noise thresholds are adaptively updated for each measurement during quiet periods between disturbance responses. The user need specify only the source of the measured load variables that are to have feedforward compensation and the user specified variable and its thresholds to be used for classifying stored model parameter sets. Furthermore, another feature of the present embodiment is that no pretune procedure is necessary since the compensators may be commissioned with zero parameter values.

The present embodiment of the invention can be used advantageously to partially decouple interacting loops. The integral feedback input (or feedback controller output) of another loop is merely treated as one of the measured load variables of the present loop.

With the foregoing and other objects, advantages, and features of the invention which will become hereinafter apparent, the nature of the invention may be more clearly understood by reference to the following detailed description of the invention, the appended claims, and to the several views illustrated in the attached drawings. Like items are marked by like numerals or indicators on the drawings.

BEST MODE FOR CARRYING OUT THE INVENTION

Figure 6A:
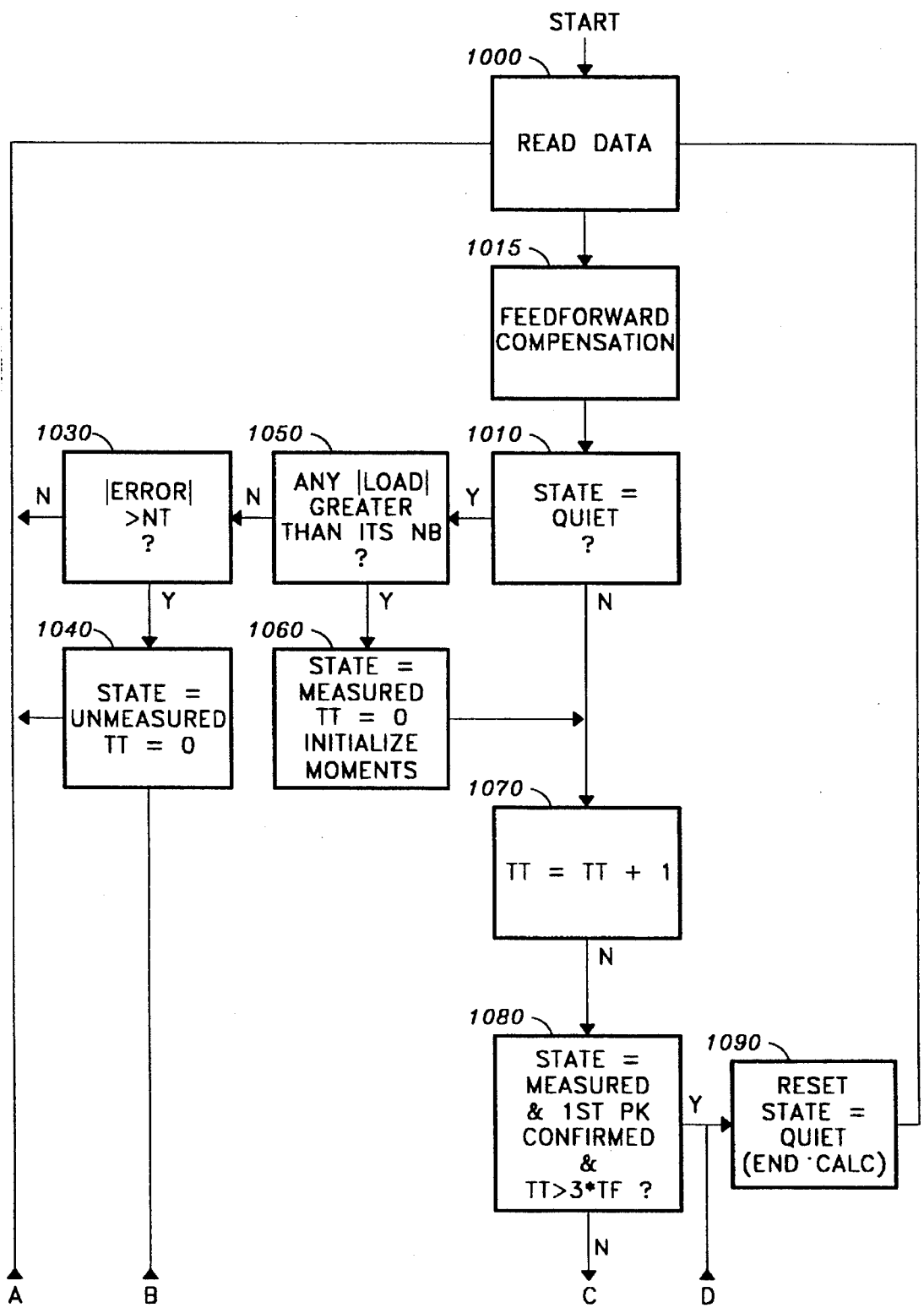
FIG. 6 is an abbreviated flow diagram illustrating the method and apparatus of FIGS. 2 and 3.
Figure 6B:
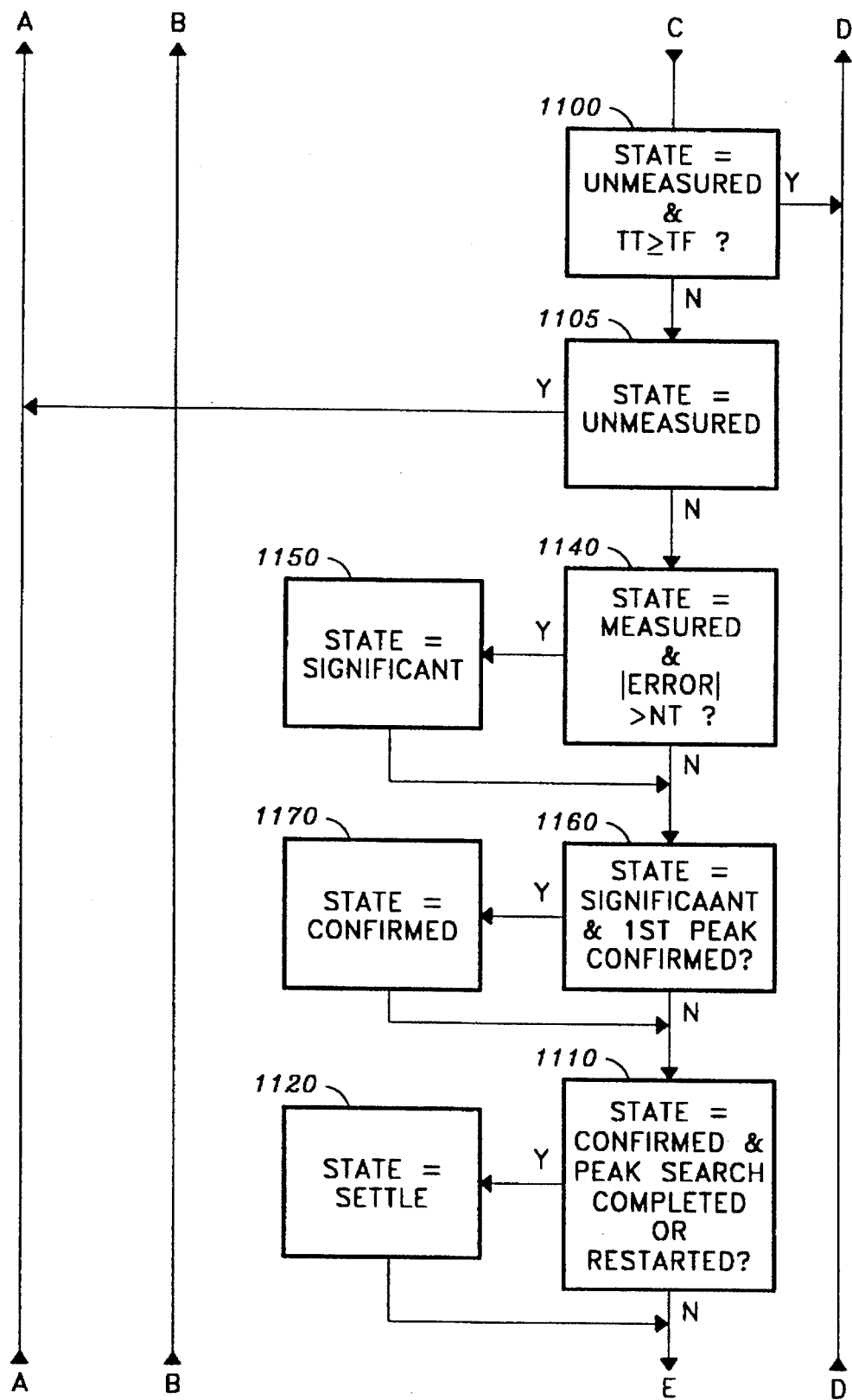
Figure 6C:
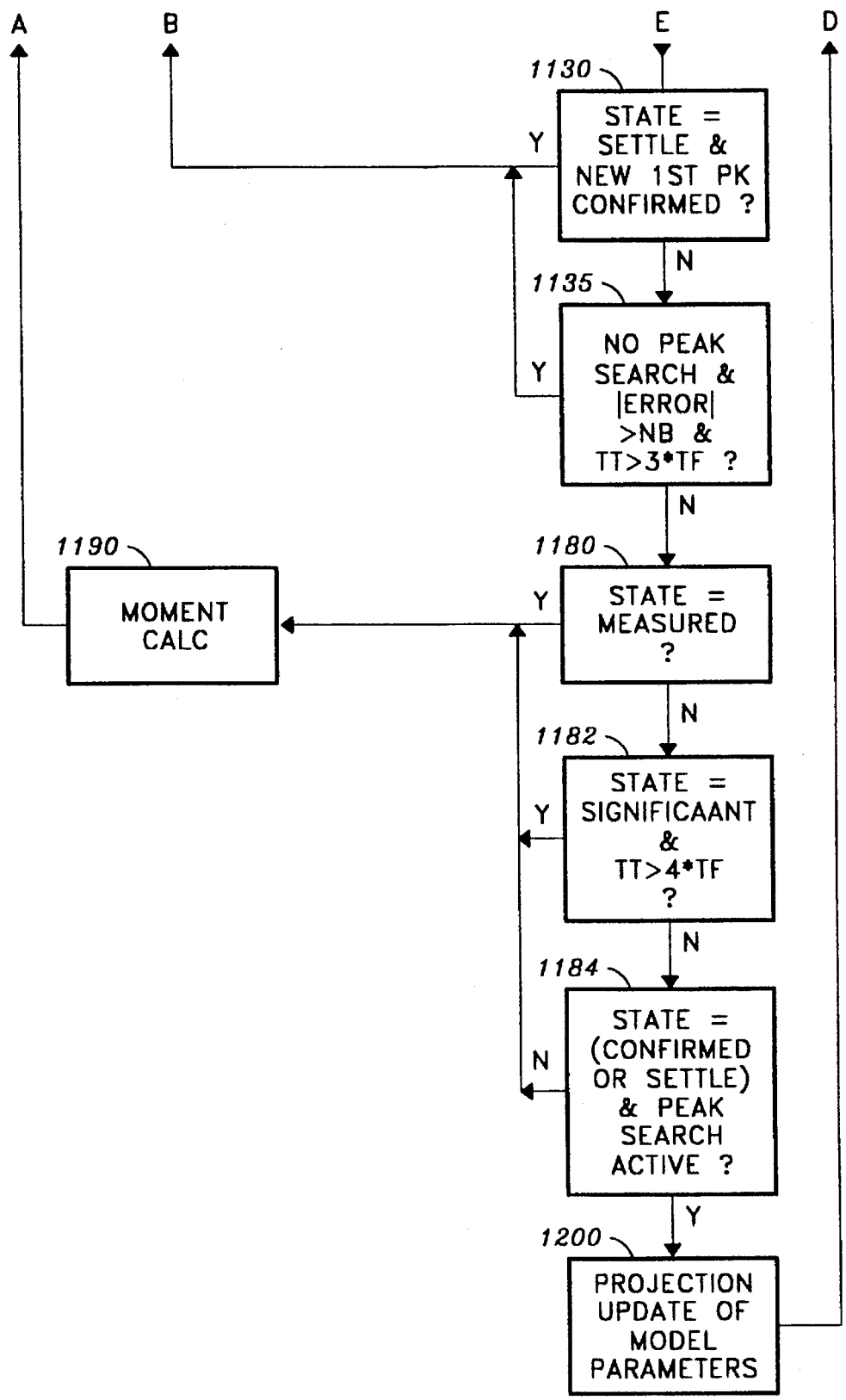

The present embodiment of the invention is similar to the example previously described in U.S. patent application Ser. No. 07/355,026. An adaptive feedforward control method and apparatus provide a controller in which feedforward compensators tune for measured load variables. In the following discussion, certain references are directed to a simplified flow diagram example, FIG. 6, illustrating the present improvements. The apparatus is shown schematically in FIGS. 1, 2, and 3.

The present embodiment described includes several additional features not included in U.S. patent application Ser. No. 07/355,026. These include 1) absolute compensation; 2) detuning of feedforward compensation when feedforward and feedback would conflict; 3) adaptively tuned band-pass filtering instead of derivative filtering for identifier inputs; 4) using peak detection for sensing the end of a response to a measured load; 5) multiple stored sets of model coefficients, indexed according to conditions at the start of an isolated response, disturbance direction and subrange of a user specified variable; and 6) adapted noise threshold for each measured variable. These are described below.

Absolute Compensation

Figure 1:
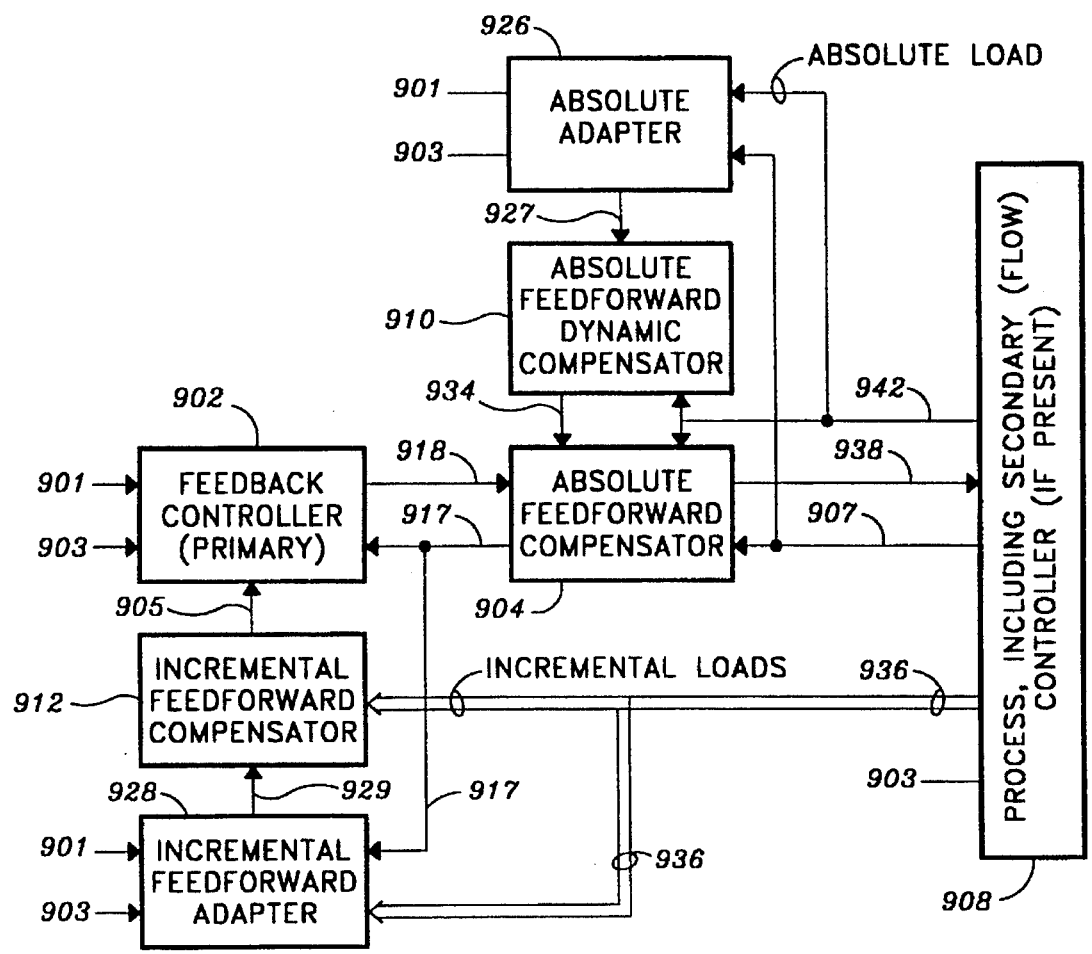
FIG. 1 is a simplified block diagram of the control loop of an improved embodiment of the invention, with incremental and absolute compensation.

A block diagram of the improved adaptive feedforward control apparatus is shown in FIG. 1. A secondary flow controller may adjust the manipulated flow in proportion to a measured load flow. The primary temperature or compensation controller adjusts the target ratio or difference of the manipulated flow to the load flow. FIG. 1 illustrates the use of the secondary measurement 907 (flow) for back calculation in the integral feedback path, used to avoid integrator windup when the secondary output is constrained. The combined controller output 938 may be used as the combined integral feedback signal 907 when a secondary controller is not used.

In FIG. 1, blocks 902, 904, and 908 represent the feedback (primary) controller, the absolute feedforward compensator, and a process under feedforward control (such as a distillation process), respectively. A secondary controller, if used, is included in the process block 908. In FIG. 1 generally, the absolute elements are disposed above these elements, and the incremental elements are disposed below them. A more detailed schematic representation of the PID (proportional, integral, derivative) feedback controller and incremental feedforward compensator portions of the primary controller are shown in FIG. 2, and portions of the absolute feedforward compensator are shown in FIG. 3.

A set point signal 901 is supplied to the primary or feedback controller 902, and to the absolute adapter 926 and the incremental feedforward adapter 928. Primary controller 902 receives additional signals representing the controlled measurement on line 903, the incremental feedforward compensation signal on line 905, and the integral feedback signal on line 917, as will be described hereinafter. The absolute feedforward compensator block 904 receives the feedback and incremental feedforward controller output signal on line 918, an absolute feedforward compensation signal on line 934, an absolute feedforward measured load signal on line 942, and a secondary measurement signal or combined controller output signal 938 on combined integral feedback line 907, and provides a back-calculated integral feedback signal on line 917 to the feedback (primary) controller 902 and a combined controller output 938 with the set point of a secondary controller or the process manipulated variable included within process block 908.

The secondary controller in process block 908 (if used) receives its set point input from the combined controller output on line 938 and its measurement 907 input from the process block 908. Either the secondary controller or the combined controller output on line 938 provides a control signal to the manipulated variable (valve input) of the process, also in block 908. The process 908 in turn provides measurement signals of the absolute feedforward measured load on line 942 and from each of possibly several incremental feedforward measured loads on a group of lines identified by 936. (The number of incremental load lines and incremental load signals is determined by the number of incremental loads in the particular configuration.) The process also provides the primary measurement on line 903 and the combined integral feedback on line 907.

Figure 2:
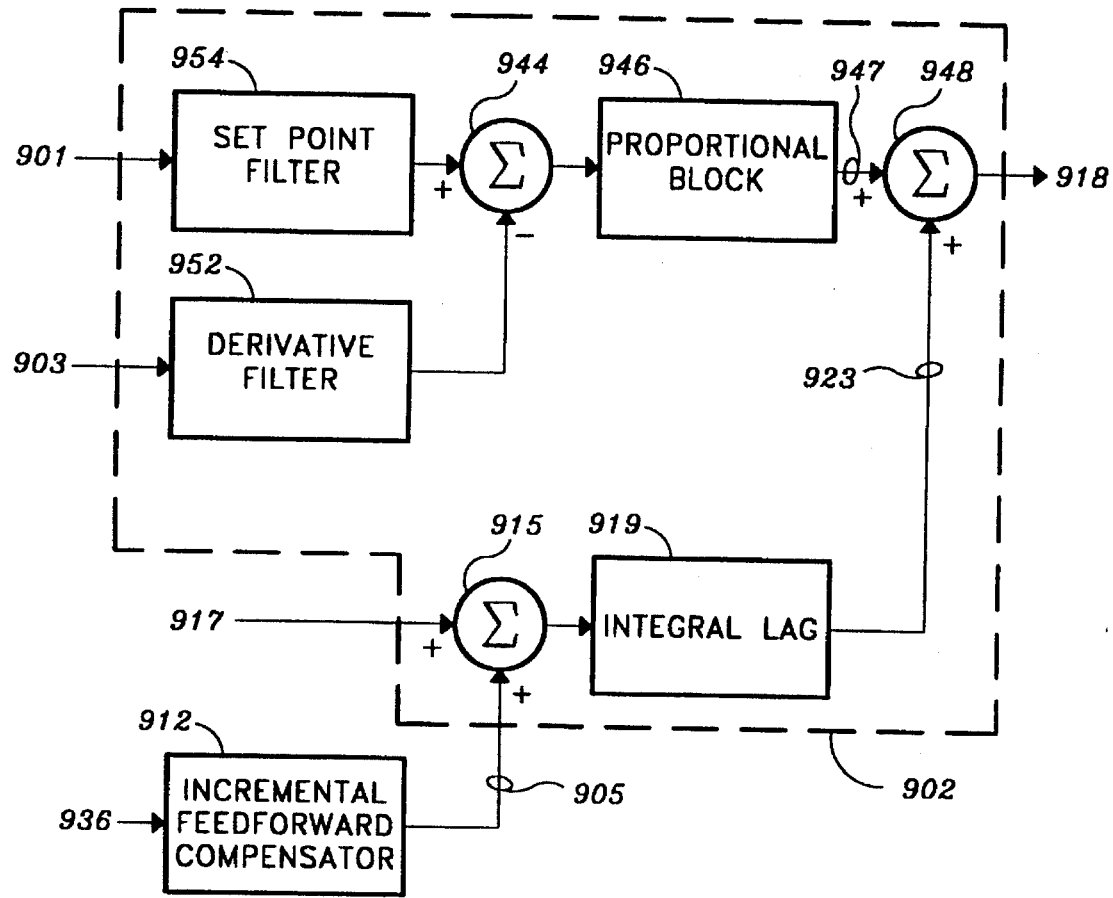
FIG. 2 is a partial simplified schematic diagram of portions of FIG. 1.
Figure 3:
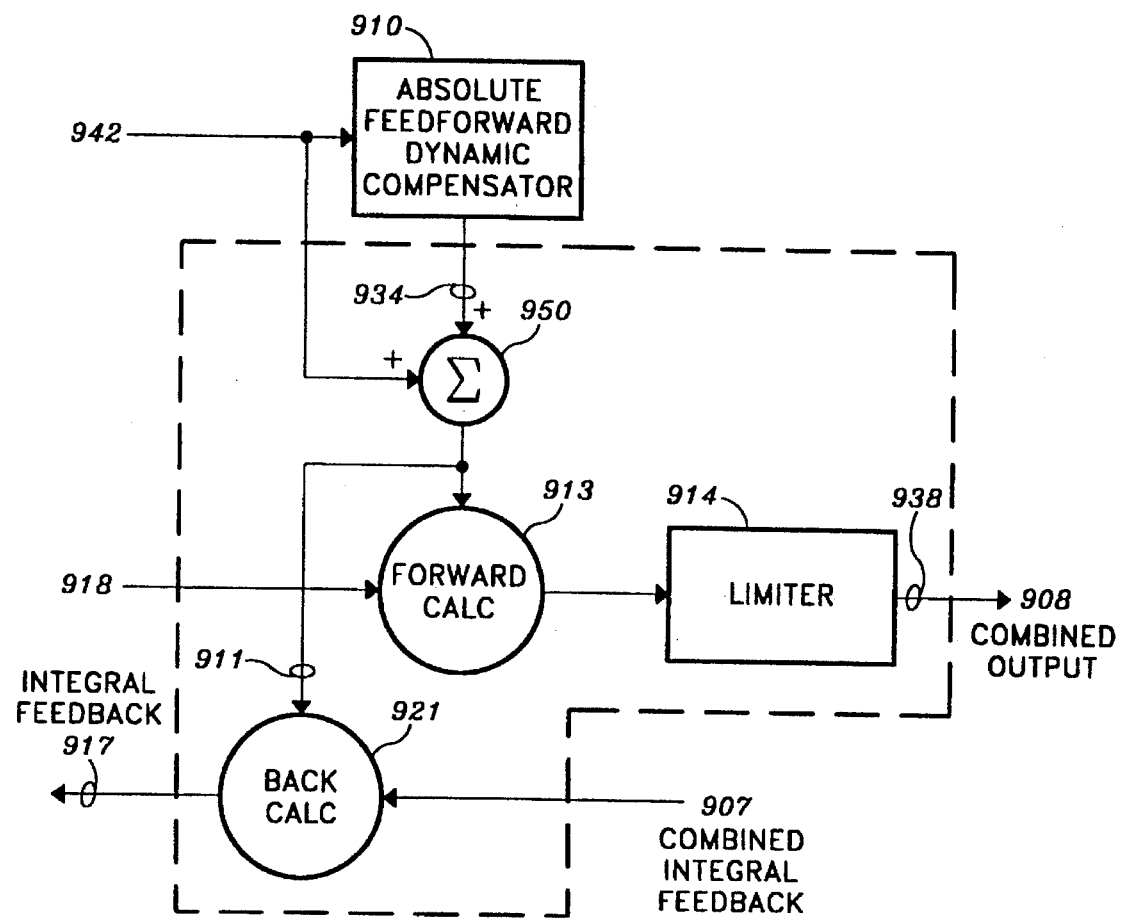
FIG. 3 is a partial simplified schematic diagram of other portions of FIG. 1.

The internals of the primary controller 902 and absolute feedforward compensator 904 are shown generally in FIGS. 2 and 3. The set point signal 901 is received at the set point filter 954 $(1+bIs)/(1+Is)$ and conveyed to summing junction block 944. Here, s is the Laplace operator, I is the controller integral time, and b is the lead-lag ratio, a tunable parameter which ranges from 0.2 to 1, depending on the process type. The controlled measurement signal 903 (see also FIG. 1) is similarly received at derivative filter 952 $(1+1.1Ds)/(1+0.1Ds+0.5(0.1Ds)^2)$ and conveyed to summing junction 944 where it is subtracted from the output signal from set point filter 954. D is the controller derivative time. The resultant sum signal is conveyed to the proportional band block 946 (100/P) to develop the proportional band signal 947, conveyed to summing junction 948, which junction 948 also receives an integral term 923 from integral lag block 919 $(1/1+Is)$. P is the proportional band in per cent. The incremental feedforward compensation signal 905 is input to the integral feedback summing junction 915 which also receives the integral feedback signal present on line 917. The signal from summing junction 915 is the input to the integral lag block 919. The feedback and incremental feedforward controller output 918 is provided by summing signals on lines 947 and 923 in summer 948 and is supplied to the absolute feedforward compensator 904.

In FIG. 3, absolute feedforward compensator 904 includes a summing junction 950, forward calculation block 913 and a back calculation block 921. The summing junction 950 receives the absolute feedforward measured load signal 942 and the absolute dynamic feedback compensation signal 934, the summed output of junction 950 is supplied as the denominator to back calculation block 921 via line 911 and also to forward calculation block 913. Forward calculation block 913 receives as its second input the feedback controller output signal 918 from junction 948. The product or sum of the two signals is limited in block 914 and output as the combined controller output signal 938. Back calculation block 921 also receives the combined integral feedback input 907. Its output, the integral feedback signal 917 supplied to the feedback controller 902, is either the ratio or difference of the signal on 907 and that on 911.

Figure 4:
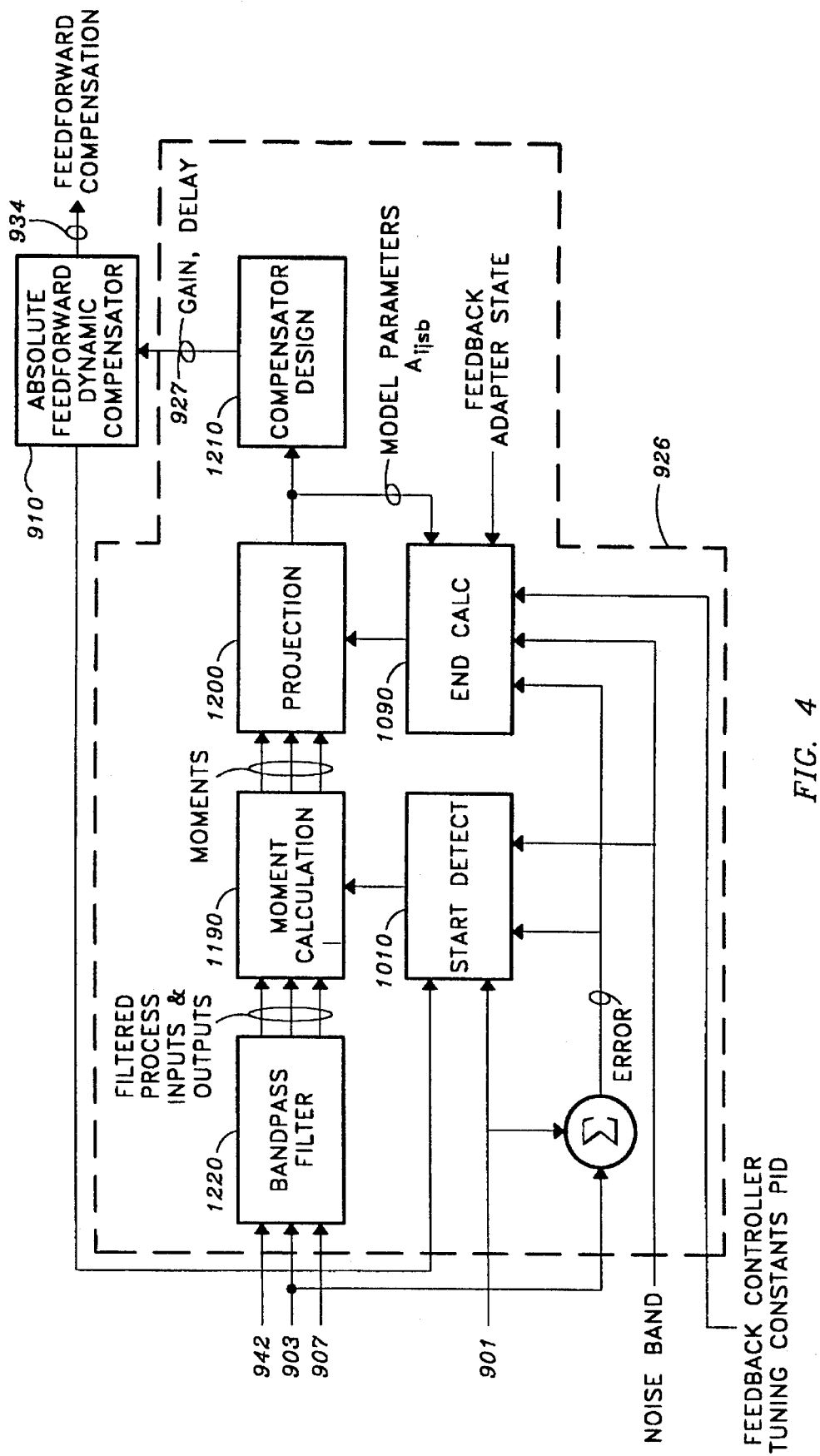
FIG. 4 is a partial simplified illustration of the internal structure of the absolute compensators, wherein the incremental feedforward compensator elements are shown in parentheses.

The absolute feedforward dynamic compensator 910 shown in FIGS. 1, 3, and 4 receives signals from the absolute feedforward measured load 942 and the absolute feedforward adapter 926 on line 927. The absolute feedforward dynamic compensator 910 supplies the absolute feedforward compensation signal to the compensator 904 on line 934.

Figure 5:
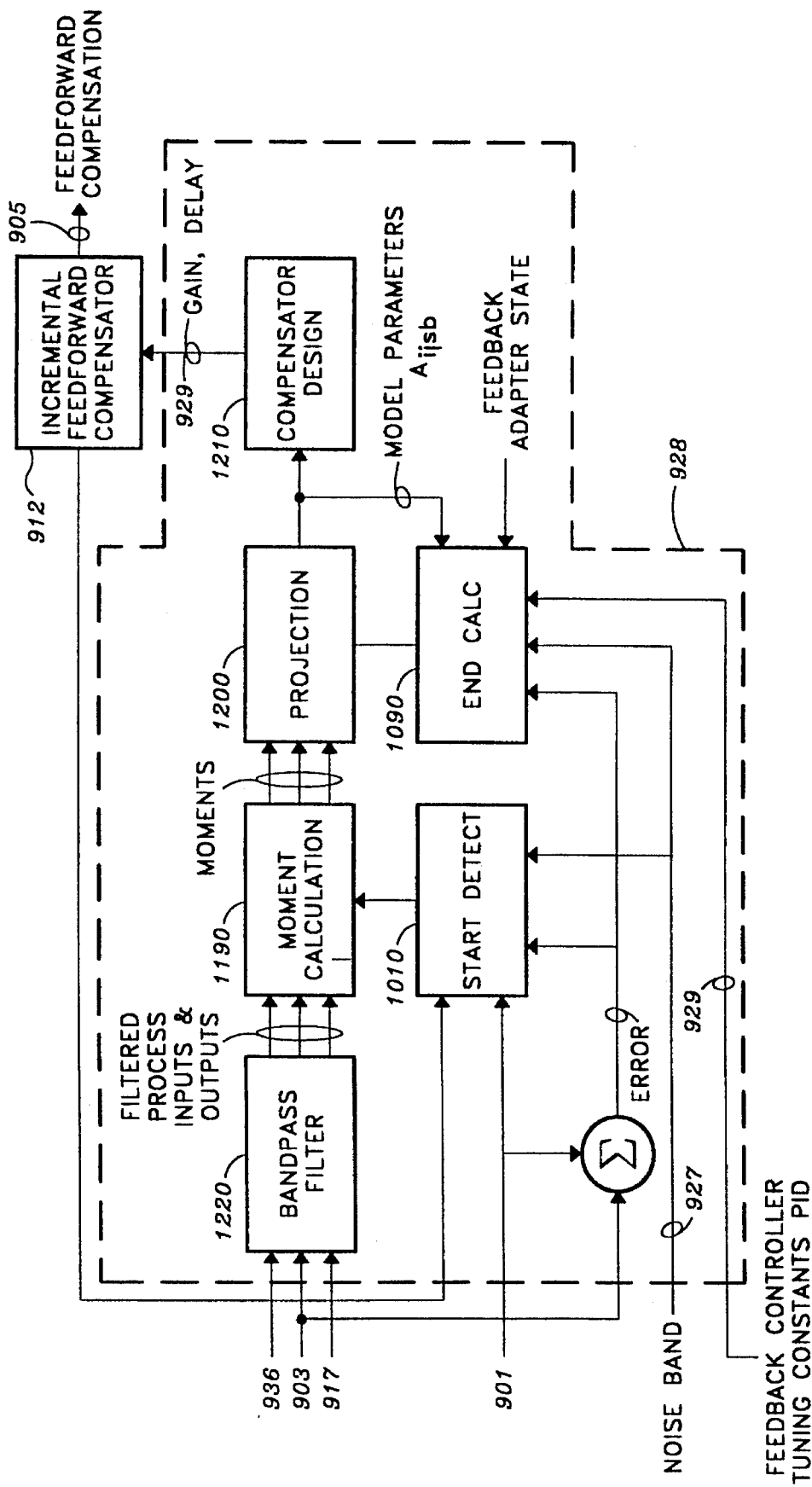
FIG. 5 is a partial simplified illustration of the internal structure of the incremental compensators, wherein the incremental feedforward compensator elements are shown In parentheses.

Incremental feedforward compensator 912 (FIGS. 1, 2, and 5) receives signals from the incremental feedforward measured loads 936 and the incremental feedforward adapter 928 on line 929. The incremental feedforward adapter 928 supplies the incremental feedforward compensation on line 905 to the feedback (primary) controller 902 where it is accumulated with the controller integral action.

When both absolute and incremental compensations (911, 915, respectively) are employed, the incremental compensation could be used to compensate for the inlet temperature or composition of a load stream, whose outlet temperature or composition is the primary controlled variable appearing on line 903. The absolute compensation can be used to compensate multiplicatively for the load stream flow. The forward calculation block 913 is a multiplier and the back calculation block 921 is a divider which divides signal 907 by signal 911.

The moment calculating process (block 1190) of the incremental feedforward compensator 912 (FIG. 5) is triggered by sensing a significant change in an incremental feedforward measured load 936 or set point 901. Moments of the set of variables (of the previously described embodiment) are related by the model equations involving unknown coefficients. The variables include incremental feedforward loads 936, the primary measured variable 903, and the integral feedback term 917.

The moment calculating process (block 1190) of the absolute feedforward dynamic compensator 910 is triggered by sensing a significant change in the absolute feedforward measured load at 942 or set point 901 (start detect 1010). Moments of the model variables are related by model equations. The variables include the absolute feedforward measured load signal 942, the primary measured variable 903, and the combined integral feedback input 907, all of which are first subjected to bandpass filtering 1220 (FIG. 6).

Separate sets of model coefficients are used for the primary measured variable 903 for each of the two cases. A set point signal 901 disturbance triggers an update for both models since this type of disturbance provides significant information for updating the model coefficients weighting the primary measurement 903. The closed loop characteristic time TF used to determine the expected end of an isolated response, is also used to set bandpass filter parameters 1220 for each of the identified inputs, and to normalize the time scale for moment (1190) and model coefficient (projection) calculations (1200). The time TF is calculated (End Calculation block 1090) from the incremental model coefficients weighting the primary measurement according to equation 66 given in U.S. patent application Ser. No. 07/355,026 and equation 6 in the present embodiment. Thus, even when there are no incremental loads, it is necessary to run the incremental adapter whenever the primary set point triggers an adaptation.

In a pressure or level loop application, compensation is usually applied incrementally. For example, in boiler level control, the secondary measurement, feedwater flow, is usually the combined integral feedback input variable 907. Its difference with steam flow is adjusted by the primary level control. Since there is no need to update the compensator gain, an absolute compensator 904 can be used for this application. The forward calculation block 913 and back-calculation block 921 would be a summer and subtractor, respectively. The feedforward compensation (with adapted gain correction) could alternatively be supplied using the usual incremental feedforward compensator 912 through line 905.

Detuning the Feedforward Compensator

When there is more process delay in the path to the controlled (primary measurement) variable 903 from the feedback controller output (manipulated variable) 918 or combined controller output 938 than from the incremental feedforward measured load variables 936 or the absolute feedforward measured load 942, perfect feedforward compensation is not possible. Combined feedback and feedforward actions may cause greater error than either action alone. As discussed in our earlier embodiment, it is common to detune the feedback (primary) controller 902 to avoid conflicting behavior and to improve the stability margin. However, this approach will degrade the loop performance in response to unmeasured disturbances. A better choice, when the feedback controller is adaptively tuned, is to detune the feedforward compensator; i.e., incremental feedforward compensator 912 or absolute feedforward compensator 910.

The effective delay of the i'th compensator is given in equation 5. When this value is negative, an unrealizable negative delay is indicated, therefore gain compensation (equation 4) alone is used instead of gain and lead compensation as suggested in our earlier embodiment. Furthermore, when the compensation is incremental, the magnitude of the gain contribution is reduced in proportion to the negative delay, becoming zero when the negative delay exceeds half the closed loop characteristic time. The magnitude of the gain contribution is given by equation 1:

(Equation 1)

This feedforward detuning strategy has been selected to minimize integrated absolute error. When the feedforward contribution is reduced to zero, feedback alone is available to counter the load disturbance.

Filtering of Identifier Signals (block 1220)

Our earlier embodiment described in U.S. patent application Ser. No. 07/355,026, employed a derivative filter on the identifier signals in order that each of the filtered signals approaches zero in steady state. In the present invention, this is a necessary condition for the moments to be finite. Additionally, for moment convergence, it is important to remove high-frequency noise components from each of the signals. This is done using adaptively tuned bandpass filters instead of the simple derivative filter. These filters can be considered to be the derivative filter in cascade with a low-pass filter. It is preferred that its low-pass section be a 0.7 damped-quadratic filter with time constant of half the closed-loop characteristic time TF. The low-pass filter is not critical. The preferred filter transfer function is given by equation 2 for bandpass filters 1220:

(Equation 2)

Peak Detection

Our earlier embodiment made use of the closed loop characteristic time and the error response to test for the response end. When an adaptive feedback controller of the type described in U.S. patent application Ser. No. 07/553,915 is used as the primary feedback controller, the state of the feedback adapter indicates the number of peaks that have already been confirmed. This information may be used to supplement the tests based on closed loop characteristic time. See FIG. 6.

When feedforward state is "measured disturbance" and either the first peak is confirmed or the time since the disturbance exceeds three closed loop characteristic times 1080, the disturbance response is deemed insignificant 1090 ("end calc") and the compensator coefficients are not updated.

When the feedforward state is "significant measured response" and the first peak is confirmed 1160, the feedforward state is changed to "feedback (state) confirmed" 1170.

When the feedforward state is "feedback confirmed" and the feedback state changes to "state confirmed" ("quiet") or "locate peak 1" 1110, the feedforward state is changed to "settle" 1120 pending a decision to update the feedforward adaptation. This indicates that the adaptive feedback controller considers the initial error response to be completed and a new overlapping response may be starting.

And when the feedforward state is "settle" and a new first peak is confirmed 1130, the feedforward state is changed to "unmeasured disturbance" 1040 and no adaptive update is performed. This also happens if the feedback controller is not adapting, the absolute control error exceeds the noise band value, and the time since the response start exceeds the expected response time (three times TF) 1135.

If the state is "settle" and the adaptive feedback controller state is "quiet" 1184 or if the state is "significant measured disturbance" and the time since the start of the response exceeds (for example) four times the closed-loop characteristic time at 1182, the response is considered to be completed and isolated 1080. The model parameters are then updated using the projection method 1200, the settled values of the measured variables are stored, and the feedforward state returned to "quiet" 1090 ("end calc").

Otherwise, the logic controlling the moment calculation remains as described in U.S. patent application Ser. No. 07/355,026.

Multiple Sets of Model Parameters

In order to deal more effectively with process nonlinearity, several sets of model parameters are stored. Each set is indexed according to measured conditions existing at the start of a new disturbance response. When a new disturbance is detected, the conditions existing at that instant are used to select the most appropriate stored model parameter set. New values of the compensator parameters are based on these model parameters. The selected model parameters 1210 are updated at the completion of the response, provided the response is isolated.

The conditions sensed at the beginning of each isolated response include the sign of the load change that triggered the response and the subrange of a user specified variable. The user specified variable range is preferably separated into three subranges using two user-specified thresholds. One of ordinary skill in the art will recognize that more or less subranges and user-variables could also be used.

This approach provides a second level of adaptation for the feedforward compensators, a programmed adaptation which exploits successful past experience to cope with nonlinear process behavior.

Recognizing a Disturbance Response Start (block 1010)

At each computing interval the set point, loads, controlled variable, and integral feedback input are converted to percent of full scale values and the state of the feedforward adapter is checked 1000. There are five possible adapter states: 1) quiet, 2) unmeasured disturbance, 3) measured disturbance, 4) significant measured disturbance, 5) confirmed disturbance, and settle.

If the state is "quiet" 1010, the set point and measured loads are compared with their previous settled values to determine whether one has made an absolute change larger than its noise band value. See FIG. 6, block 1050. If one of these has made such an absolute change, then the changed variable and the sign of the change are noted, the state is changed to "measured disturbance", and the moment calculation is initialized, 1060.

The noise value for each input is the sum of the user supplied noise threshold, converted to per cent of measurement range, and the signal's peak-to-peak (6 sigma in this illustrative example) noise band, which may be updated during quiet periods if desired. The noise update in this example is calculated as a first factor times the square root of half the average of squared-sample-to-sample differences over a second factor times the closed-loop characteristic time interval. In this illustrative example, the first factor is selected as six and the second factor is selected as three. This noise sigma estimate is based on the assumption that the noise components of successive sampled signal values are uncorrelated.

If a significant change is not found 1050 and the absolute control error exceeds the noise value 1030, the state is changed to "unmeasured disturbance", 1040. Otherwise the state remains "quiet" while waiting for the next computing interval. The "unmeasured disturbance" state 1040 may also be entered from other states if the error response is judged not to be isolated 1130 and 1135 or if any of the variables are out of range. When the state has remained "unmeasured disturbance" for one closed-loop characteristic time (a value that is updated at the start of each measured disturbance) and the state of the adaptive feedback controller is "quiet" or inactive 1100, the current values of the measured variables are stored as new settled values and the state is returned to "quiet" 1090.

Moment Initialization

At the start of a measured disturbance response 1060, one of six sets of stored model constants is selected based on the sign of the triggering measured-variable change and on the subrange of a user-selected variable. The sign index is chosen according to the predicted direction of the manipulated-variable change needed to counter the disturbance. The value of the user variable may fall in one of three subranges, separated by user-configured thresholds in this example. The user variable, which could be the set point or one of the measured loads, should be selected as an indicator of the nonlinear behavior of the process. If the process is linear, the user may select a constant as the user variable, or set the thresholds to 0 and 100%.

The model constants are used to calculate the feedforward-compensator parameters and, together with the values of the feedback controller P, I, and D tuning constants, the "closed-loop characteristic time" (TF). The closed-loop characteristic time (or the state of the adaptive feedback controller, if it is active) is used to estimate the time to the peak and the time to settle for an isolated error response. If the error response peak is less than the noise value or if the state is still "measured disturbance" when the time since the disturbance start exceeds 3 TF (three characteristic times)

1080, the model parameters are not updated 1090. A significant, isolated error response is needed to make a reliable model update 1200.

If the state is "measured disturbance" and the absolute error exceeds the noise threshold value NT 1140, the state is changed to "significant measured disturbance" 1150.

Each of the feedforward compensators is a gain-delay approximated in this embodiment with a 2nd order Butterworth filter, see equation 3.

(Equation 3)

Other compensator forms may also be used, selection of such being within the ability of one of ordinary skill in the art.

The gain is the corresponding zero-order model parameter $a10sb$. The index, i, signifies the associated load. The 0 index indicates zero order. The indices "s" and "b" indicate the particular set of stored constants associated with the disturbance sign and the user specified variable subrange. When the gain is not zero (see equation 4):

(Equation 4)

the delay is given by the ratio of first-order model parameter to the zero-order parameter times the scaling factor, T (see equation 5), used in the moment calculations, chosen in this example as 0.3 times TF.

(Equation 5)

However, a negative delay is not physically realizable. If a negative delay is calculated, the gain is multiplied by a factor according to equation 1 which decreases linearly with negative delay, becoming zero when the negative of the calculated delay equals or exceeds half of the closed-loop characteristic time, and the delay is set to zero. This detunes the feedforward controller instead of the adaptive feedback controller, when the two otherwise would produce an overcorrection. Feedback is relied upon when nearly perfect feedforward compensation is not possible.

The closed-loop characteristic time (TF) is the coefficient of the first order term in the closed-loop characteristic equation:

(Equation 6 )

where D is the derivative time, I is the integral time, P is the proportional band, and N is the index for the controlled (primary measurement) variable 903. For a non-self-regulating process, $aN0=0$. Otherwise it is the inverse gain of the process.

Compensation Calculation

Regardless of the state, feedforward compensation is calculated at each time step. The compensator for each variable is a gain-delay (Equation 3) with the delay approximated by a 0.7 damped quadratic (second order Butterworth), which are included in each of the compensators 910, 912, The quadratic is used in order to attenuate high-frequency corrections that might cause excessive valve activity with no noticeable improvement in control error. Also, the quadratic is easier to compute and requires less memory than a pure delay.

If the compensation is incremental, each load signal is bandpass filtered, then compensated, and the result added together. The sum is then accummulated (integrated), preferably in the feedback controller, where the integrated sum is effectively added to the controller output. This allows the feedforward compensator gain terms to be updated while the process is in steady state, without 'bumping' the process. Rate limiting or other internal feedback controller peculiarities may make it necessary to use a separate integrator.

If the compensation is to be absolute, the adapter determines only the dynamic portion of the compensation. See FIG. 3. The adaptive dynamic term, the quadratic-filtered load minus the load, is added to the measured load signal before it is applied to the feedback controller output. The compensation is structured in this way so that only dynamic compensation is lost when the adapter is turned off. The adapter-determined gain is not used. See FIGS. 2 and 3.

It would be desirable to zero the incremental (differentiated) feedforward compensation at each time step after it has been accumulated. This would prevent a continuing accumulation of the same incremental corrections when the adapter is turned off or when it operates with a longer computing interval than that of the control blocks.

Each of the measured signals used in the model-identification process, the loads, controlled variable, and integral feedback, should be subjected to band-pass filtering, 1220. This removes both low- and high-frequency components from the signals, helping to assure that time moments (weighted integrals) of isolated response signals converge to steady values in a finite time. A 0.7 damped filter is preferred for this purpose. The filter time constant in this example is adaptively programmed to be 30% of the closed-loop characteristic time, a value which may be empirically optimized. These filters are located in the adapters 926 and 928.

Moment Calculation (block 1190)

Figure 7:
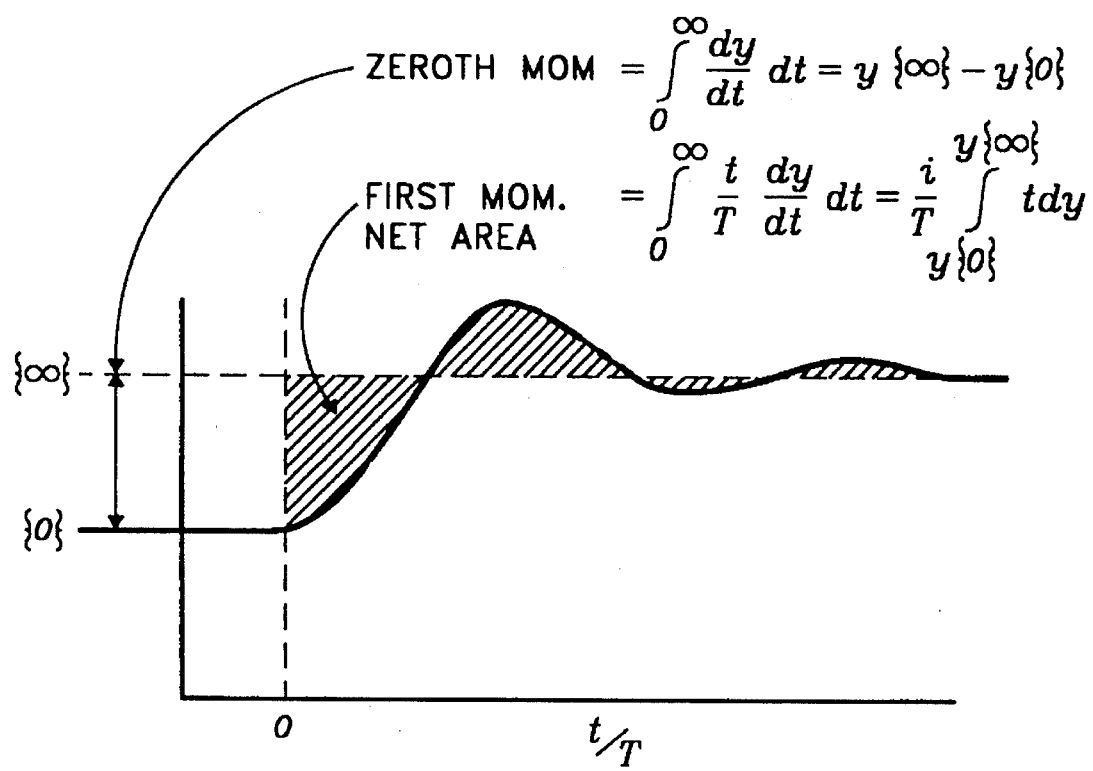
FIG. 7 is a diagram illustrating the moments of a signal derivative.

If the state is "measured disturbance", "significant measured disturbance", "confirmed disturbance", or "settle", the zeroth and first moment integrals of the band-pass-filtered signals are updated 1190 each time step. The zeroth moment is the steady state signal change as shown in FIG. 7. The first moment is the net area under the filtered signal curve cross-hatched in FIG. 7. Filtering in the compensators 910 and 912 helps to make this area a definite finite value, since it makes the filtered signal final value approach zero. The first moment is weighted by the scaling factor, 1/T. This scaling factor may be empirically optimized: T is selected at 30% of the closed-loop characteristic time for this example. It scales and eliminates the time dimension from the model coefficients 1200, which are calculated from the moments 1190. Each coefficient is thereby made to have the same units and expected value range. This improves the convergence rate of the projection method.

The moment integrals must converge to a finite value in a finite time in order for the moment values to be insensitive to the time of integral termination. Because noise is not completely removed by filtering, high-order moments are much more sensitive to the termination time because of heavy weighting (by time to the power of the moment order).

The Moment-Projection Method (block 1200)

Each of the measured process variables is characterized by zero and first order moments. These moments are directly related to Taylor series coefficients of the bandpass filtered signal's x{t} Laplace transform, X{s}, as in equation 7.

(Equation 7)

The process output is related to the process inputs with a model. The form of the model equations is chosen to simplify the subsequent compensator design calculation, as in equation 8.

(Equation 8)

where N is the number of measured loads whose index i ranges from 0 to N-1, N is the index of the controlled variable, and N+1 is the index of the integral feedback input (or controller output) and N+2 is the index for the combined integral feedback (or combined controller output).

If one of the compensations is absolute, two sets of model equations are employed as in FIG. 1, each using a different integral feedback input and different model coefficients for the controlled variable. See FIG. 3. Both sets of equations are solved following a set point disturbance, but only one set is solved following a load disturbance.

Each transform is expanded into a Taylor series as in equation 9.

(Equation 9)

Equating the terms multiplying the same powers of s yields two equations when only powers less than two are considered (equations 10 and 11):

(Equation 10)

(Equation 11)

There are only two equations, but there are 2 (N+1) unknowns. The projection method finds the new values of the model parameters that satisfy the two equations and minimize the sum of squared model-parameter changes. Only those model parameters that multiply nonzero moment values can influence the model equation errors. Constant load variables have zero moment values. Therefore, model parameters associated with constant load variables will not be updated. Typically, the parameters that will change the most are those that multiply the largest moment values.

For the method of this example to work best, noise must be effectively removed from the process data so that it is reasonable to satisfy the model equations exactly. This is done by continuing the moment integrations of the filtered signals for an isolated response until the values no longer change significantly.

As with the first embodiment, in this present example embodiment, the current set of model parameters can be represented by a point in a multidimensional parameter space. Along each of the orthogonal coordinate axes, all but one of the model parameters is zero. The locus of parameter combinations that satisfy the two model equations form a subspace. The projection method finds the point in the subspace that is closest to the point for the current model parameter set. For distance to be significant, the units and the expected range of all the model parameters should be the same. The parameter values are made dimensionless in this example by converting all of the signals from engineering units to percent of range and by normalizing the time scale with the factor, T, selected to equal 30% of the closed-loop characteristic time TF in the present illustrative example in order to achieve fast convergence.

The first step in the projection calculation is to determine the errors in the model equations using the current model parameters, equations 12 and 13.

(Equation 12)

(Equation 13)

Next, the values of the correlation coefficients are determined, equations 14, 15, and 16.

(Equation 14)

(Equation 15)

(Equation 16)

The parameter see is introduced to reduce the model parameter correction when the error response is not much greater than the noise value. It represents an unmeasured and unmodeled load step at the start of the disturbance with magnitude equal to the noise value. Thus, see is the square of the noise value.

These coefficients are combined to calculate a denominator (den) used in the equations which follow.

(Equation 17)

Lagrange multipliers, introduced to enforce the constraint (model) equations, are then calculated, (equations 18 and 19).

(Equation 18)

(Equation 19)

Finally, the model parameters are then updated (i ranges from 0 to N), equations 20 and 21.

(Equation 20)

(Equation 21)

While there have been shown and described what at present are considered to be the preferred embodiments of the invention, it will be apparent to those skilled in the art that various changes and modifications can be made herein without departing from the scope of the invention defined by the appended claims.

APPENDIX $$0. \leq \frac{gain}{a_{i0sb}} = \left(1 + .5 \frac{delay_i}{TF}\right) \leq 1.$$  Equation 1

$$\frac{s}{1 + .5TFs + .5\,(.5TFs)^2}$$  Equation 2

$$\frac{gain_i}{1 + delay_i\, s + (delay_i)^2 \frac{s^2}{2}}$$  Equation 3

$$gain_i = a_{i0sb}$$  Equation 4

$$delay_i = \left(\frac{a_{i1sb}}{a_{i0sb}}\right) T \geq 0$$  Equation 5

$$TF = D + I\left(1 + a_{N0sb}\frac{P}{100}\right)$$  Equation 6

$$
\begin{aligned}
X\{s\} &= \int_0^\infty \exp(-st)x\{t\}dt \\
&= \int_0^\infty (1 - st \ldots )x\{t\}dt \\
&= \int_0^\infty x\{t\}dt - sT \int_0^\infty \left(\frac{t}{T}\right)x\{t\}dt \\
&= M_0 - sTM_1 \ldots
\end{aligned}
$$  Equation 7

$$X_{N+1}\{s\} = \sum_0^N A_i\{s\}\, X_i\{s\}$$  Equation 8

$$M_{(N+1)0} -$$  Equation 9

$$sTM_{(N+1)1} \ldots = \sum_0^N (a_{i0sb} - sTa_{i1sb}\ldots)(M_{i0} - sTM_{i1})$$

$$M_{(N+1)0} = \sum_0^N a_{i0sb}(M_{i0} - sTM_{i1})$$  Equation 10

$$M_{(N+1)1} = \sum_0^N (a_{i1sb}M_{i0} + a_{i0sb}M_{i1})$$  Equation 11

$$e0 = M_{(N+1)0} - \sum_0^N a_{i0sb}M_{i0}$$  Equation 12

$$e1 = M_{(N+1)1} - \sum_0^N (a_{i0sb}M_{i1} + a_{i1sb}M_{i0})$$  Equation 13

$$s0 = s00 + \sum_0^N M_{i0}^2$$  Equation 14

-continued
APPENDIX $$s1 = \sum_0^N M_{i1}^2$$  Equation 15

$$s01 = \sum_0^N M_{i0}M_{i1}$$  Equation 16

$$den = s0(s0 + s1) - s01^2$$  Equation 17

$$b0 = \frac{(s0 + s1)e0 - s01\, e1}{den}$$  Equation 18

$$b1 = \frac{(s0\, e1 - s01\, e0)}{den}$$  Equation 19

$$a_{i0sb} = a_{i0sb} + b0\, M_{i0} + b1\, M_{i1}$$  Equation 20

$$a_{i1sb} = a_{i1sb} + b1\, M_{i0}$$  Equation 21

We claim:

1. A method of automatically adjusting at least one control parameter of a feedforward controller used in a control system coupled to regulate a process having inputs and a result output in a closed loop of said control system, and having a measured variable signal responsive to a measurable process disturbance response to a disturbance of said process, comprising the steps of:

a) detecting the beginning of the process disturbance response by sensing a significant change in either of the measured variable signal or the control parameter and then detecting the ending of a disturbance response;

b) determining whether the disturbance is an unmeasured disturbance response;

c) characterizing the inputs and process result output during a disturbance response by moments which comprise time-weighted integrals performed on the process result output and inputs;

d) selecting a model equation if the disturbance is a measured disturbance;

e) relating the characterized inputs and process result output in general transfer function model equations to generate transfer function parameters relating the inputs to the process result output when the disturbance is a measured disturbance; and f) adapting transfer function model equations to relate the characterized inputs and process result output to generate transfer function parameters relating the inputs to the process result output when the disturbance is an unmeasured disturbance; and g) adjusting said at least one control parameter.

2. The method of claim 1, wherein the step of detecting the end of a disturbance response includes peak detection.

3. The method of claim 2, wherein said peak detection includes the steps of generating an error signal corresponding to the closed-loop response of the process to an upset condition and characterizing the amplitude features of said error signal.

4. The method of claim 3, wherein said controller has a closed loop response, further including the step of determining the number of peaks previously confirmed in a significant measured response as a function of the closed loop response of the controller.

5. The method of claim 1, wherein the parameter values are rendered dimensionless by the steps of first converting the signals from engineering units to percent-of-range signals, and subsequently normalizing the percent-of-range signals by a scale factor T.

6. The method of claim 5, wherein scale factor T is equal to or greater than 20 percent of a closed loop characteristic time factor TF.

7. The method of claim 5, where scale factor T is equal to or less than 50 percent of a closed loop time factor TF.

8. The method of claim 1, where the successful adaptations of steps e) and f) are correlated to conditions at the start of the disturbance, the step of storing the adaptation information for subsequent recall.

9. The method of claim 8, further including the step of correlating the adaptations according to disturbance conditions and subsequently indexing the adaptations according to the correlated conditions.

10. The method of claim 1, wherein the step of detecting the beginning of a disturbance response comprises sensing a control parameter which exceeds a measured variable signal noise threshold.

11. The method of claim 10, further including the step of adaptively updating at least one measured variable signal noise threshold between disturbance responses.

12. The method of claim 1, where the feedforward controller includes means for receiving a set point signal, a primary measurement signal, and a secondary measurement signal, further including the step of approximating gain delay in the feedforward controller by an adaptively tuned low-pass filter.

13. The method of claim 12, wherein the low-pass filter includes a 0.7 damped quadratic.

14. The method of claim 1, where the feedforward controller includes an absolute compensator comprising means for receiving an absolute feedforward measurement load signal and for producing a dynamic feedforward compensation signal, further including the step of producing a dynamic feedforward compensation signal from the absolute feedforward measurement load signal.

15. The method of claim 1, wherein the feedforward controller includes a compensator having gain delay, further including the step of adjusting the gain delay.

16. The method of claim 1, wherein the moments are initialized at the start of a disturbance response.

17. The method of claim 1, wherein the sign index of a given moment is chosen according to a predicted direction of the manipulated-variable change needed to counteract the disturbance.

18. The method of claim 1, wherein in step e) the general transfer function model equation is:

$$X_{N+1}\{s\} = \sum_{0}^{N} A_i\{s\} X_i\{s\}. \qquad \text{Equation 8}$$

19. Multivariable adaptive feedforward control of a process by feedforward controller controlling at least one process loop in a control system regulating said process and having inputs and a process result output, in which the process is subjected to response transients due to process disturbances, wherein feedforward adaptation is accomplished by the method comprising the steps a) detecting a beginning of the process disturbance response by sensing a significant change in either of a measured variable signal or a control parameter and then detecting the ending of the response disturbance response;

b) characterizing the inputs and process result output during a response transient by moments which comprise time-weighted integrals performed on the process result output and inputs; and c) relating the characterized inputs and process result output in general transfer function model equations to generate model compensation parameters relating the inputs to the process result output, d) generating a feedback control signal by i) generating an error signal representing the difference between the set point value and the closed-loop response of the process to a process disturbance;

ii) identifying and measuring amplitude values characteristic of pattern features of said error signal; and iii) automatically adjusting at least one process control parameter of a feedback controller to improve the difference between said measured characteristic and a target characteristic.

20. The method of claim 19, further including the steps of sensing a conflict between the feedforward control and the feedback control signal, and detuning the feedforward controller such that rejection of unmeasured-load disturbances by the feedback controller is not compromised.

21. The method of claim 19, wherein in further including step e, computing new compensation parameters from past model compensation parameters.

22. The method of claim 19, wherein said feedforward control is related to a signal value and said feedback control signal and said feedforward control signal are used to control the same process loop, introducing incremental correction first.

23. The method of claim 19, wherein the step of detecting the beginning of a disturbance response comprises sensing a control parameter which exceeds a measured variable signal noise threshold.

24. The method of claim 23, further including the step of adaptively updating at least one measured variable signal noise threshold between disturbance responses.

25. The method of claim 19, wherein the feedforward controller includes means for receiving a set point signal, a primary measurement signal, and a secondary measurement signal, further including the step of approximating gain delay in the feedforward controller by an adaptively tuned low-pass filter.

26. The method of claim 25, wherein the low-pass filter includes a 0.7 damped quadratic.

27. The method of claim 19, wherein the feedforward controller includes an absolute compensator comprising means for receiving an absolute feedforward measurement load signal and for producing a dynamic feedforward compensation signal, further including the step of producing a dynamic feedforward compensation signal from the absolute feedforward measurement load signal.

28. The method of claim 19, wherein the feedforward controller includes a compensator having gain delay, further including the step of adjusting the gain delay.

29. The method of claim 19, wherein the moments are initialized at the start of a disturbance response.

30. The method of claim 19, wherein a given moment sign index is chosen according to a predicted direction of a manipulated-variable change needed to counteract the disturbance.

31. The method of claim 21, wherein the past model compensation parameters are zeroed before the new compensation parameters are computed.

32. The method of claim 19 wherein in step c) the general transfer function model equation is:

$$X_{N+1}\{s\} = \sum_{0}^{N} A_i\{s\} X_i\{s\}. \qquad \text{Equation 8}$$

33. An adaptive feedback controller for use with a process having multiple variables, comprising:

a) means for manipulating one of said process variables;

b) a primary controller comprising means for (i) receiving a set point signal, a primary measurement signal, a differentiated feedforward signal, and an integral feedback signal and for (ii) producing a primary controller output signal;

c) a secondary controller comprising means for (i) receiving a secondary control set point signal and a secondary measurement signal, and (ii) outputting a secondary control signal for controlling said manipulating means; and d) a function block comprising means for (i) receiving an absolute load signal, a dynamic absolute compensation signal, the primary controller output signal, the secondary measurement signal, and (ii) for producing the secondary control set point signal and the integral feedback signal.

34. The controller of claim 33, further including an absolute compensator comprising means for receiving an absolute feedforward measurement load signal and for producing a dynamic feedforward compensation signal.

35. The controller of claim 33, wherein the compensator further includes a gain delay.

36. The controller of claim 35, further including means for receiving a set point signal, a primary measurement signal, and a secondary measurement signal, and wherein the gain delay is approximated by an adaptively tuned low-pass filter.

37. The controller of claim 36, wherein the filter includes a 0.7 damped quadratic.

38. The controller of claim 34, having moment and model coefficient calculation time scales, and a closed-loop characteristic time TF used to determine an expected end of an isolated response, to set filter parameters for each of one or more identifier inputs, and to normalize the time scale for moment and model coefficient calculations, and TF is the coefficient of the first order term in the closed-loop characteristic equation:

$$TF = D + I\left(1 + a_{N0sb}\frac{P}{100}\right)$$

where D is the derivative time, I is the integral time, P is the proportional band of the feedback controller, and N is the index for the primary measurement signal.

39. The controller of claim 33, further including an incremental adapter comprising means for receiving a set point signal, a primary measurement signal, an integral feedback signal, and incremental loads, and for producing an incremental feedforward compensation signal.

40. The controller of claim 33, further including an incremental adapter comprising means for receiving a set point signal, a primary measurement signal, a controller output signal, and incremental loads, and for producing an incremental feedforward compensation signal.

41. The controller of claim 39, further including means associated with each load for load signal filtering, compensating, adding the result to the sum, then integrating the sum in a feedback controller to effectively add the accumulated total incremental feedforward compensation to the feedback controller output.

42. The controller of claim 40, further including means associated with each load for load signal filtering, compensating, adding the result to the sum, then integrating the sum in a feedback controller to effectively add the accumulated total incremental feedforward compensation to the feedback controller output.

43. The controller of claim 39, wherein the compensator further includes a gain delay.

44. The controller of claim 41, further including means for updating the gain delay terms while the process is in steady-state, without bumping the process.

45. The controller of claim 44, wherein the gain delay is approximated by an adaptively tuned low-pass filter.

46. The controller of claim 45, wherein the filter includes a 0.7 damped quadratic.

47. The controller of claim 41, having moment and coefficient calculation time scales, and a closed-loop characteristic time TF used to determine an expected end of an isolated response, to set filter parameters for each of one or more identifier inputs, and to normalize the time scale for moment and model coefficient calculations, and TF is the coefficient of the first order term in the closed-loop characteristic equation:

$$TF = D + I\left(1 + a_{N0sb}\frac{P}{100}\right)$$

where D is the derivative time, I is the integral time, P is the proportional band, and N is the index for the primary measurement signal.

48. The controller of claim 35, further including means for adding the absolute load signal and the dynamic absolute compensation signal.

49. The controller of claim 48, wherein the primary controller and the absolute compensator have an effective gain which is substantially proportional to an absolute feedforward signal produced from addition of an absolute feedforward measured load signal and the feedforward compensation signal.

50. The controller of claim 39, further including means for zeroing the incremental feedforward compensation subsequent to each accumulation before new compensation parameters are computed.

51. The method of claim 40, further including means for zeroing the incremental feedforward compensation subsequent to each accumulation before new compensation parameters are computed.

* * * * *